(12) United States Patent
Phillips

(10) Patent No.: US 11,096,001 B2
(45) Date of Patent: Aug. 17, 2021

(54) SYSTEMS AND METHODS FOR DIGITALLY MODELING ANALOG AUDIO HARDWARE DEVICES

(71) Applicant: Matthew J. Phillips, Hobe Sound, FL (US)

(72) Inventor: Matthew J. Phillips, Hobe Sound, FL (US)

( * ) Notice: Subject to any disclaimer, the term of this patent is extended or adjusted under 35 U.S.C. 154(b) by 0 days.

(21) Appl. No.: 16/749,983

(22) Filed: Jan. 22, 2020

(65) Prior Publication Data

US 2021/0227343 A1 Jul. 22, 2021

(51) Int. Cl.
*H04S 7/00* (2006.01)
*G06F 3/16* (2006.01)
*H04R 3/04* (2006.01)
*H04R 29/00* (2006.01)

(52) U.S. Cl.
CPC .............. *H04S 7/301* (2013.01); *G06F 3/165* (2013.01); *H04R 3/04* (2013.01); *H04R 29/001* (2013.01); *H04R 2227/005* (2013.01)

(58) Field of Classification Search
CPC ........ H04R 3/04; H04R 3/14; H04R 2430/01; H04R 2227/005; H04R 29/001; H04R 29/004; H04S 2400/13; H04S 2400/07; H04S 2420/07; H04S 7/307
USPC ............ 381/101, 98–99, 103, 104–109, 303; 700/94
See application file for complete search history.

(56) References Cited

U.S. PATENT DOCUMENTS

| 2005/0004691 | A1* | 1/2005 | Edwards | G10H 1/125 700/94 |
| 2011/0002471 | A1* | 1/2011 | Wihardja | H03G 5/005 381/56 |
| 2013/0041490 | A1* | 2/2013 | Leonard | G10L 21/043 700/94 |
| 2015/0139447 | A1* | 5/2015 | Greenhoe | H03H 17/04 381/98 |

* cited by examiner

*Primary Examiner* — Disler Paul
(74) *Attorney, Agent, or Firm* — Camuti Law Group APC; Nathan Camuti

(57) ABSTRACT

A system for digitally modelling analog devices having a processor executing an executable code to select a baseline calibration signal, receive a digitized audio from an analog device having parameters with incremental controls for the parameters, wherein the digitized audio is the baseline calibration signal processed with the incremental control of the first parameter set at a neutral setting, determine a baseline impulse response of the analog device, select an incremental signal, receive a plurality of incremental audios, wherein each incremental audio corresponds to the incremental signal processed by the analog device with a unique setting of the incremental control for the first parameter, derive formant-based filters for each of the incremental audios, and construct a digital model of the analog device based on the baseline impulse response of the analog device and the plurality of formant-based filter representations of the plurality of incremental audios.

18 Claims, 7 Drawing Sheets

SYSTEMS AND METHODS FOR DIGITALLY MODELING ANALOG AUDIO HARDWARE DEVICES

BACKGROUND

Currently there are a number of solutions for software plug-ins of analog audio processing devices. Some of these solutions attempt to replace the analog devices with a software model audio plug-in, but these solutions fail to meet the needs of the industry because they are far too inefficient and use excessive CPU overhead, failing to facilitate the proper workflow to effectively replace the analog hardware devices. Other solutions attempt to offload the digital signal processing to a digital processing device that is external to the computer, but these solutions are similarly unable to meet the needs of the industry since offloading the processing defeats the purpose of creating a software model for computer-based audio production. Still other solutions seek to model analog audio processing devices by analyzing the circuit schematic and build a model based on electronic components, but these solutions also fail to meet industry needs because they do not measure audio signals passed through the device, thereby losing the unique sonic characteristics that result from the actual real-time interaction of these electronic components.

SUMMARY

The present disclosure is directed to systems and methods for digitally modeling analog audio hardware devices, substantially as shown in and/or described in connection with at least one of the figures, as set forth more completely in the claims.

DETAILED DESCRIPTION

Figure 1:
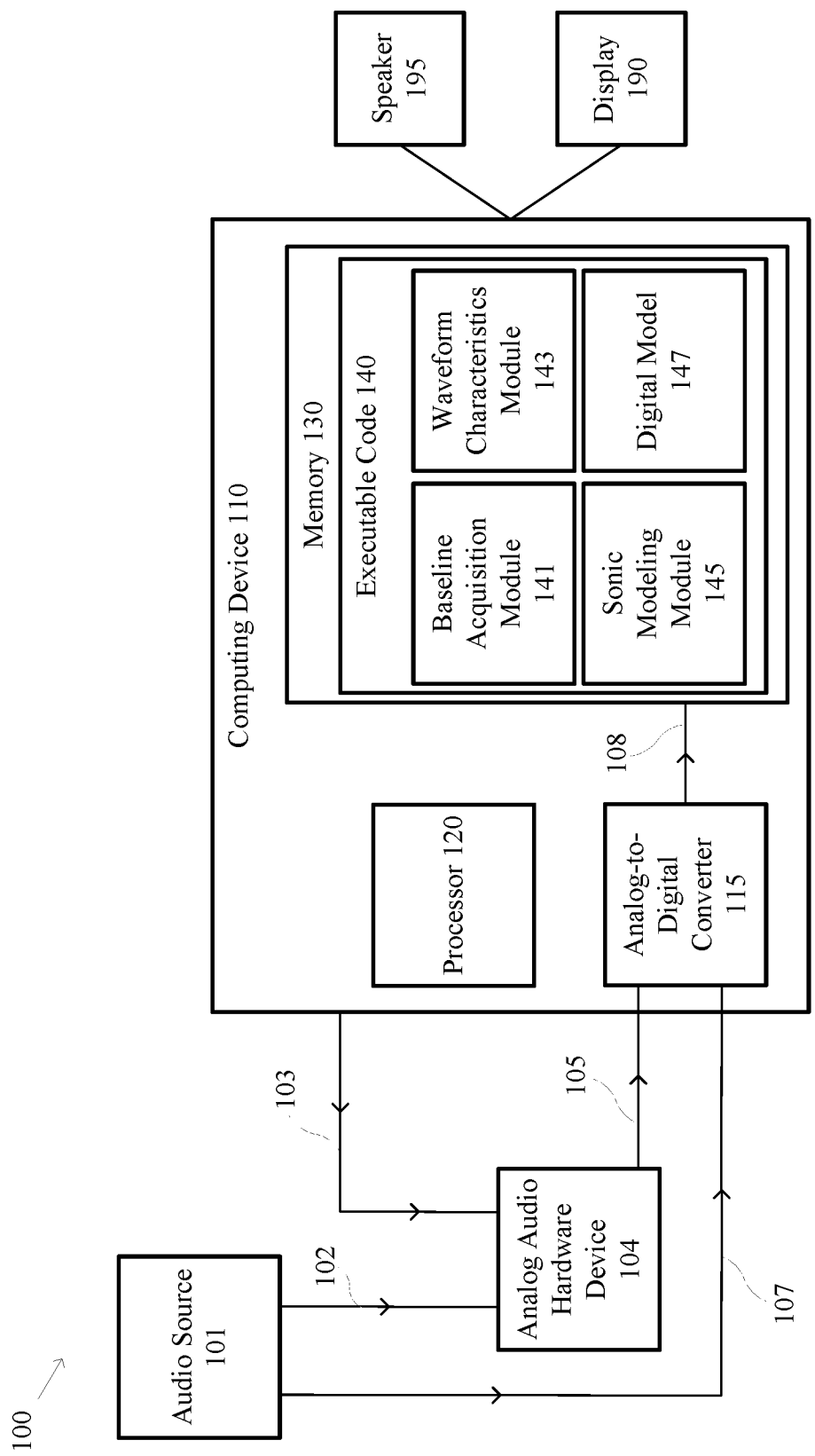
FIG. 1 shows a diagram of an exemplary system for digitally modeling analog audio hardware devices, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale and are not intended to correspond to actual relative dimensions.

FIG. 1 shows a diagram of an exemplary system for digitally modeling analog audio hardware devices, according to one implementation of the present disclosure. Diagram 100 includes audio source 101, analog audio hardware device 104, computing device 110, display 190, and speaker 195. Audio source 101 may be an analog audio source, such as a musical instrument or a microphone for receiving audio and transmitting the audio to an amplifying or processing system.

Analog audio hardware device 104 is an analog audio processing device such as an analog equalizer, an analog dynamics processor, such as a compressor, expander, or limiter, an analog amplifier, analog microphone pre-amplifier, or an analog effects processor, such as distortion). In some implementations, analog audio hardware device 104 may include a plurality of adjustable parameters, such as adjustable equalizer settings, adjustable frequency sweep controls, adjustable gain level controls, etc. The adjustable parameters may be adjustable using a two- or three-position switch to select a setting for the particular adjustable parameter, or an adjustable potentiometer such as a rotating dial control or a sliding fader control. The adjustable controls may include incremental adjustments, such as a pre-defined change in the settings, such as in a click-wheel or other graduated adjustment, or the control may adjust freely through the adjustment range of the parameter.

Computing device 110 is a computing system for use in modeling analog audio hardware devices. As shown in FIG. 1, computing device 110 includes analog-to-digital (A/D) converter 115, processor 120, and memory 130. As shown in FIG. 1, A/D converter 115 is electronically connected to memory 130, such that A/D converter 115 can make digitized audio 108 available to executable code 140 in memory 130. Using A/D converter 115, analog audio signal 105 may be converted into digitized audio 108 to allow speech recognition application 140 to process digitized audio 108 for determining the age of the individual speaking the input speech into microphone 105.

Processor 120 is a hardware processor, such as a central processing unit (CPU) found in computing devices. Memory 130 is a non-transitory storage device for storing computer code for execution by processor 120, and also for storing various data and parameters. As shown in FIG. 1, memory 130 includes executable code 140. Executable code 140 may include one or more software modules for execution by processor 120. As shown in FIG. 1, executable code 140 includes baseline acquisition module 141, waveform characteristics module 143, sonic modeling module 145, and digital model 147.

Baseline acquisition module 141 is a software module stored in memory 130 for execution by processor 120 to measure a baseline of analog audio hardware device 104. In some implementations, baseline acquisition module 141 may receive input signal 105 processed by and transmitted from analog audio hardware device 104. Baseline acquisition module 141 may measure various characteristics of input signal 105. In some implementations, audio baseline acquisition module 141 may record characteristics of input signal 105 such as the intensity or power level, frequency, phase, bandwidth, and voltage level of the input signal.

Baseline acquisition module 141 may calculate coefficients for a single Finite Impulse Response (FIR) baseline filter which, through convolution, defines the "baseline character" of analog audio hardware device 104.

Waveform characteristics module 143 is a software module stored in memory 130 for execution by processor 120 to measure a waveform of a signal processed by analog audio hardware 104. In some implementations, waveform characteristics module 143 may measure a plurality of waveforms corresponding to a plurality of settings of the adjustable controls of the various parameters of analog audio hardware device 104. Waveform characteristics module 143 may derive a formant-based filter representation of the input signal. In some implementations, waveform characteristics module 143 may incorporate a suitable mathematical software package, such as MATLAB® or GNU Octave, to run a linear predictive analysis on the resulting waveforms to derive a formant-based filter representation of the waveforms.

In some implementations, waveform characteristics module 145 may apply linear prediction to analyze the waveforms of input signal 105. Waveform characteristics module 145 may apply variable smoothing to develop a more complex model of the performance of analog audio hardware device 104. Variable smoothing may include processing the various parameters of analog audio hardware device 104 with a plurality of times, each time using a different increment for the incremental changes of the parameter setting.

Sonic modeling module 145 is a software module stored in memory 130 for execution by processor 120 to create a digital model of the sonic characteristics of analog audio hardware device 104. In some implementations, sonic modeling module 145 may identify characteristic nodes of each waveform of input signal 105 under different configurations of the adjustable settings of the various parameters of analog audio hardware device 104. A root-solution analysis of the formant-based filters corresponding to the waveforms of input signal 105 may identify the characteristic nodes. Sonic modeling module 145 may calculate a plurality of Infinite Impulse Response (IIR) filter coefficients corresponding to the settings of the adjustable controls for the parameters of analog audio hardware device 104.

Digital model 147 is a software module stored in memory 130 for execution by processor 120 to digitally model analog audio hardware device 104. Digital model 147 may be a digital model created by computing device 110 or digital model 147 may be a previously created digital model stored in memory 130. In some implementations, digital model 147 includes coefficients calculated by baseline acquisition module 141 and waveform characteristics module 143. Digital model 147 may be a software used to digitally process audio signals such that the processed audio signals have sonic characteristics that mimic the sonic characteristics of audio signals processed by analog audio hardware device 104. In some implementations, digital model 147 may include parameters corresponding to the parameters of analog audio hardware device 104. In some implementations, digital model 147 may include incremental settings corresponding to the incremental settings for each parameter of analog audio hardware device 104.

Display 190 is a display such as a computer monitor, a tablet computer display, a smart phone display, or other suitable display. Speaker 195 is an audio output speaker for playing an audio.

Figure 2:
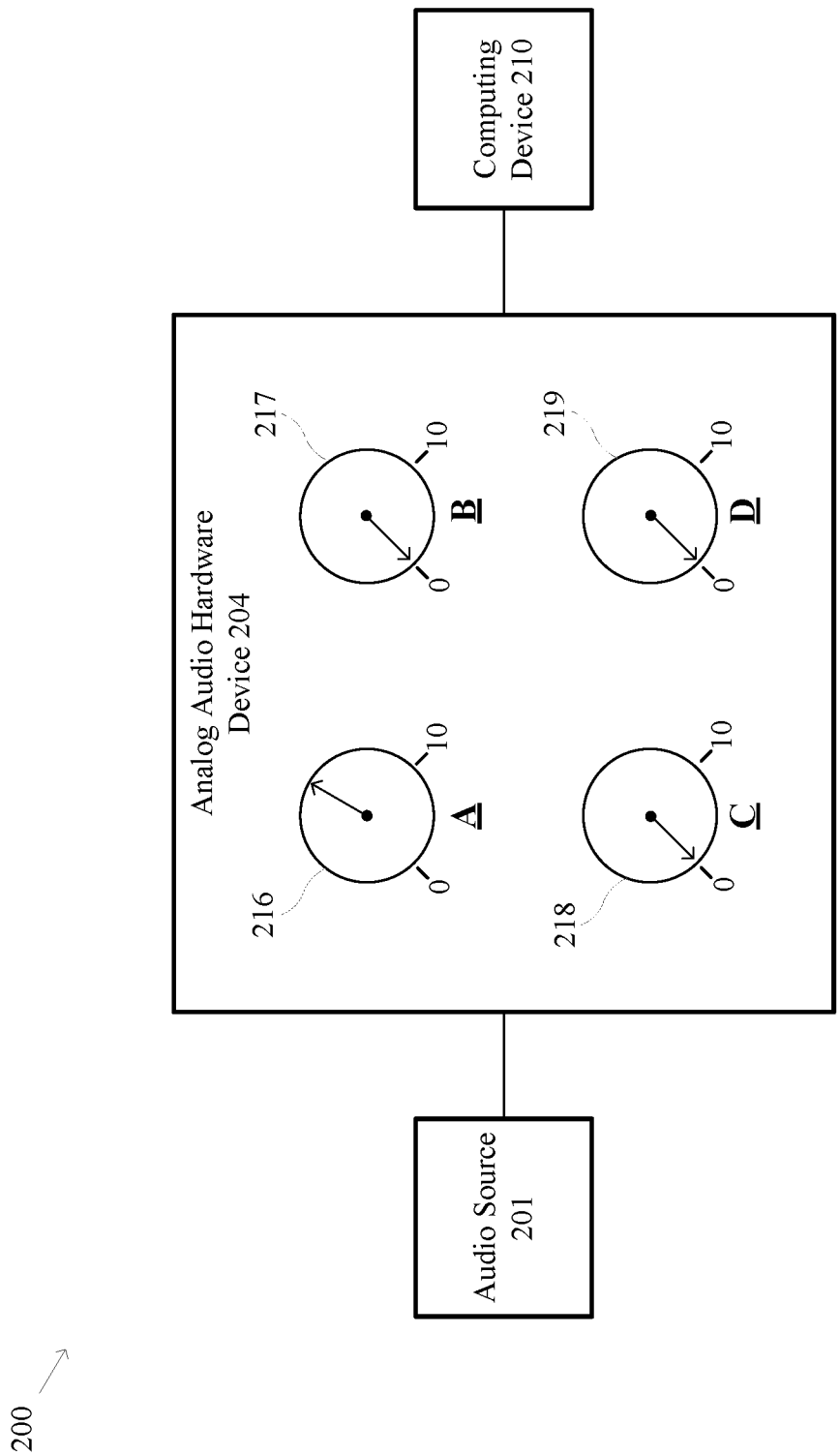
FIG. 2 shows another diagram of an exemplary system for digitally modeling analog audio hardware devices, according to one implementation of the present disclosure.

FIG. 2 shows another diagram of an exemplary system for digitally modeling analog audio hardware devices, according to one implementation of the present disclosure. Diagram 200 shows audio source 201, analog audio hardware device 204, and computing device 210. Audio device 201 is an audio source for providing suitable baseline and calibration signals to for processing by analog audio hardware device 204. As shown in FIG. 2, analog audio hardware device 204 includes parameters A, B, C, and D. Each parameter may have a plurality of settings and be adjustable using a control of analog audio hardware device 204. As shown in FIG. 2, analog audio hardware device 204 includes adjustable controls 216, 217, 218, and 219 for adjusting the settings of parameters A, B, C, and D, respectively.

Parameters of analog audio hardware device 204 may include volume, equalizer settings, frequency adjustments, gain adjustment, tone adjustment, focus, etc. In some implementations, analog audio hardware device 204 includes an adjustable control for some or all of the parameters, wherein each adjustable parameter may have a plurality of settings spanning a range. In some implementations, the adjustment from the lowest setting to the highest setting may be in graduated increments. The lowest setting may be represented by the number zero (0), and the highest setting may be represented by the number ten (10). Adjustments may be made in a step-wise manner, incrementally increasing from a lowest setting to a highest setting. The adjustable controls may include incremental adjustments, such as an adjustment with a plurality of pre-defined or graduated settings. In other implementations, the adjustable controls may include a smooth transition from a low setting to a high setting with no defined increment allowing a user to smoothly adjust the setting through the spectrum of the corresponding parameter's settings.

Figure 3:
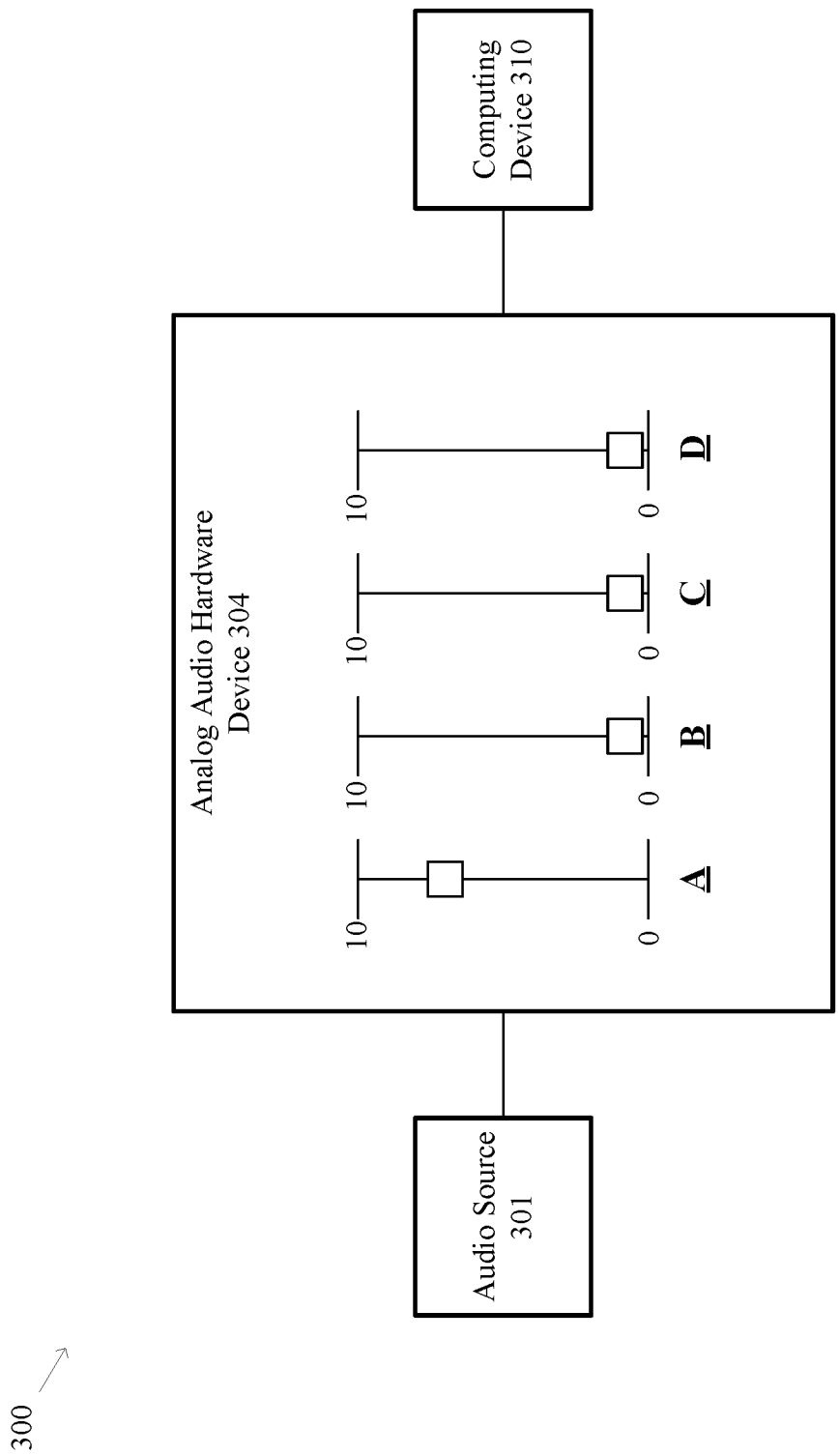
FIG. 3 shows another diagram of an exemplary system for digitally modeling analog audio hardware devices, according to one implementation of the present disclosure.

FIG. 3 shows another diagram of an exemplary system for digitally modeling analog audio hardware devices, according to one implementation of the present disclosure. Diagram 300 includes audio source 301, analog audio hardware device 304, and computing device 310. As shown in FIG. 3, the adjustable controls for the parameters of analog audio hardware device 304 are fader-style adjusters.

Figure 4:
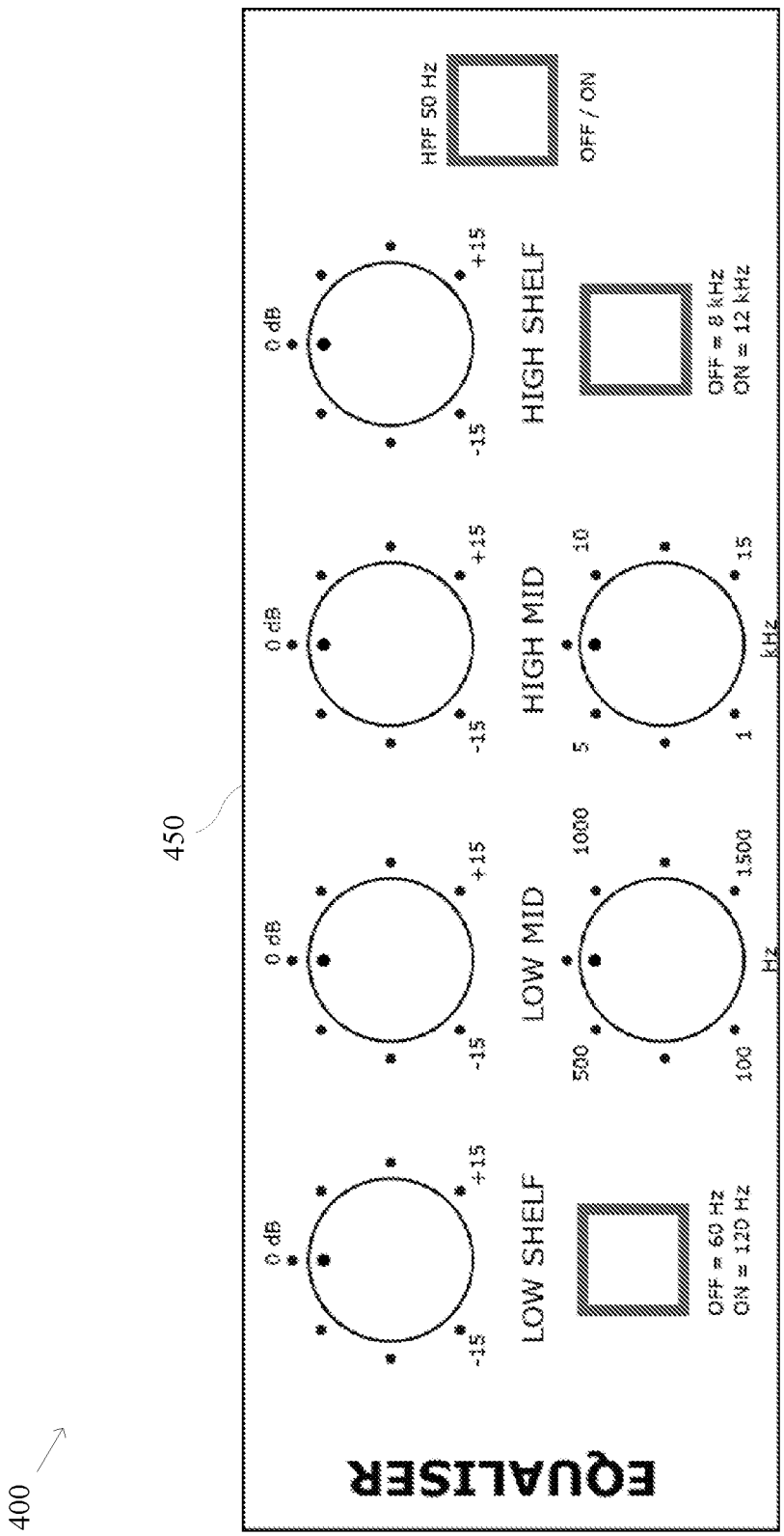
FIG. 4 shows a diagram of a diagram of an exemplary user interface, according to one implementation of the present disclosure.

FIG. 4 shows a diagram of an exemplary user interface of a system for digitally modeling analog audio hardware devices, according to one implementation of the present disclosure. Diagram 400 shows graphic user interface 450 for a four-band equalizer. As shown in FIG. 4, user interface 450 includes incremental controls for low, low mid, high mid, and high frequencies, with swept low mid [Hertz (Hz)] and high mid [kilohertz (kHz)] range bands, a low-frequency 60 Hz/120 Hz shelving point switch, a high-frequency 8 kHz/12 kHz shelving point switch, and a 50 Hz low pass filter switch. Graphic user interface 450 may be designed to resemble the appearance and controls provided on analog audio hardware device 104. A user may incrementally adjust the settings of each parameter of digital model 147 using the controls shown in FIG. 4.

Figure 5:
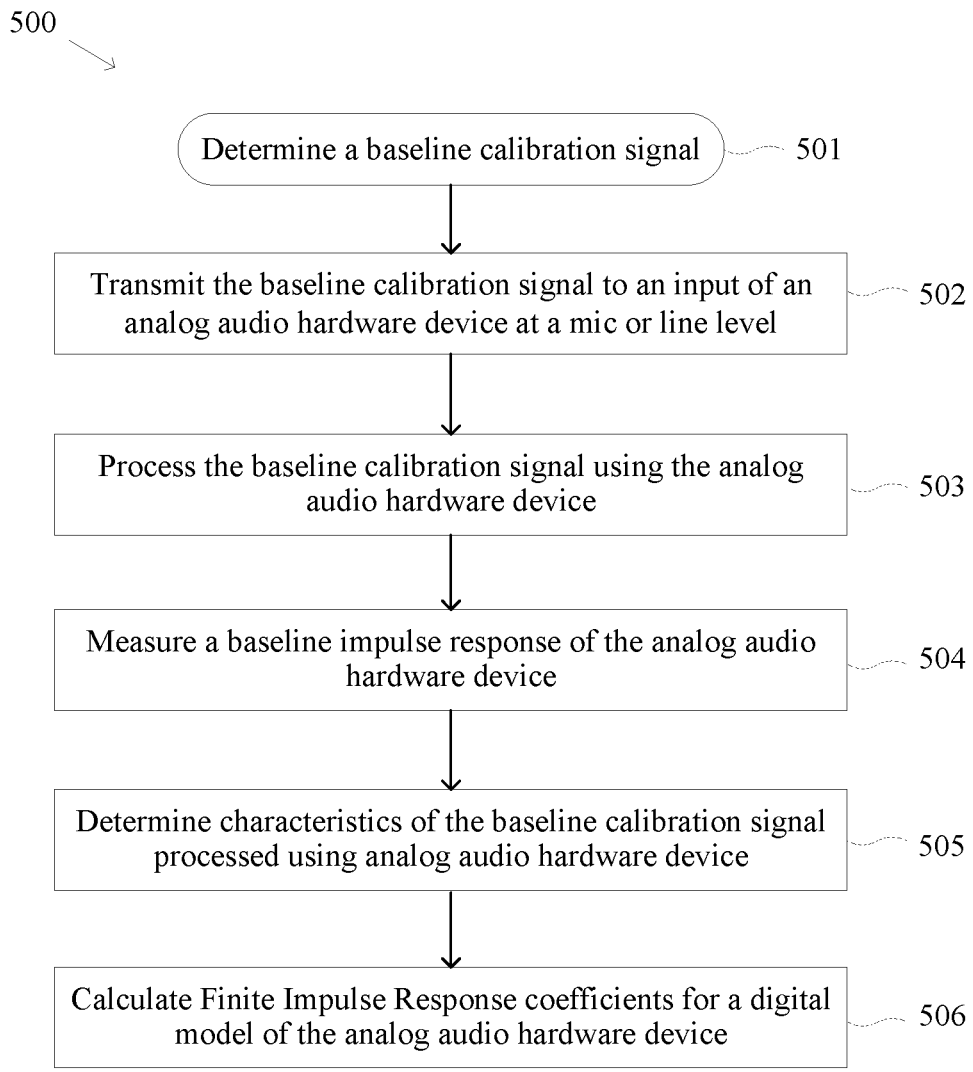
FIG. 5 shows a flowchart illustrating an exemplary method for determining a baseline impulse response of analog audio hardware devices, according to one implementation of the present disclosure.

FIG. 5 shows a flowchart illustrating an exemplary method for determining a baseline impulse response of an analog audio hardware device, according to one implementation of the present disclosure. Method 500 begins at 501 with determination of a baseline calibration signal. In some implementations, appropriate the baseline calibration signal may be a frequency sweep signal, a random noise signal, a broadband noise signal, etc. Method 500 continues at 502 with transmission of the baseline calibration signal to an input of analog audio hardware device 104 at a mic level or line level. The baseline audio signal may be transmitted from an outside calibration source, such as input signal 102 provided by audio source 101, or it may be transmitted by computer system 110, such as baseline audio signal 103.

The method continues at 503 by processing the baseline calibration signal using analog audio hardware device 104. During the baseline calibration, the incremental settings for each adjustable parameter of analog audio hardware device 104 are set to a neutral setting. A neutral setting may be a zero setting, a default setting, a factory default setting, or a user-defined neutral setting.

At 504, the method includes measuring a baseline impulse response of analog audio hardware device 104 based on the baseline calibration signal transmitted to analog audio hardware device 104 and the processed baseline calibration signal received by computing device 110. In some implementations, measuring the baseline impulse response of analog audio hardware device 104 may include comparing the baseline calibration signal and the processed baseline calibration signal. At 505, the method includes determining characteristics of the processed baseline calibration signal received from analog audio hardware device 104. At 506, the method includes calculating FIR coefficients for a digital model of analog audio hardware device 104. In some implementations, the coefficients may be calculated based on the characteristics of the processed baseline calibration signal received from analog audio hardware device 104.

Figure 6:
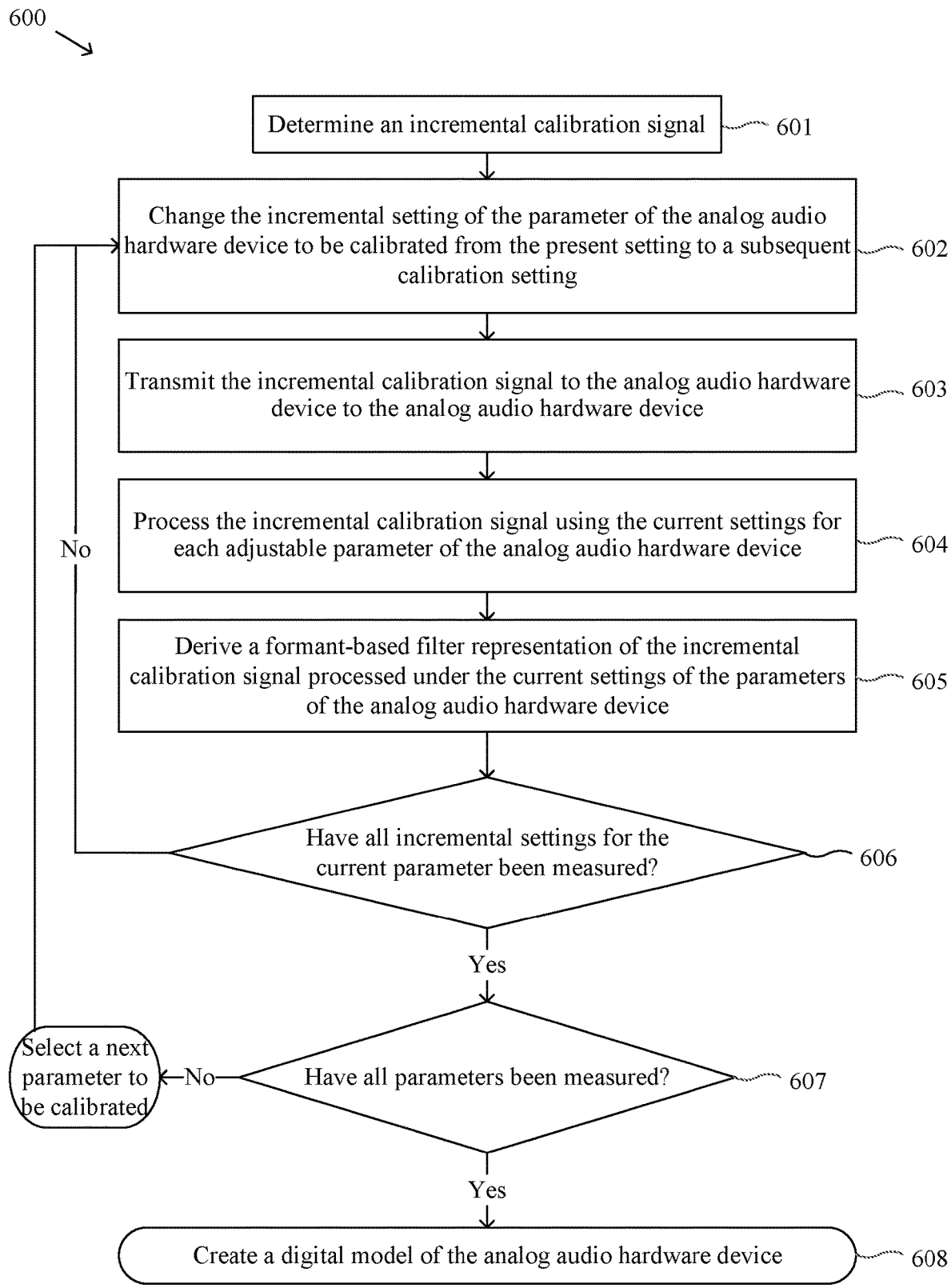
FIG. 6 shows a flowchart illustrating an exemplary method for determining a characteristic waveform of analog audio hardware devices, according to one implementation of the present disclosure.

FIG. 6 shows a flowchart illustrating an exemplary method for determining waveform characteristics of analog audio hardware devices, according to one implementation of the present disclosure. Method 600 begins with step 601 with the determination of an incremental calibration signal. In some implementations, the incremental calibration signal is a different signal than the baseline audio signal. The incremental calibration signal may be a random noise signal that is not a frequency sweep signal. At 602, the method continues with changing the incremental setting of the parameter of the analog audio hardware device to be calibrated from the present setting to a subsequent calibration setting. The present setting may be a neutral setting or a previous calibration setting. In some implementations, the incremental setting may be manually increased by adjusting a mechanical adjustment. In some implementations, the incremental setting may be adjusted using a command line interface (CLI) in a computerized process.

At 603, the method continues with transmission of the incremental calibration signal to analog audio hardware device 104. At 604, analog audio hardware device 104 processes the incremental calibration signal using the current settings for each adjustable parameter of analog audio hardware device 104. The current settings for each adjustable parameter may be a neutral configuration or an incremental setting. In some implementations, the first incremental setting may be a setting one increment from the neutral setting used to determine the baseline impulse response of analog audio hardware device 104. Subsequent incremental settings may change the adjustable parameter of analog audio hardware device 104 by one increment at a time. At 605, the method continues with deriving a formant-based filter representation of the incremental calibration signal processed under the current settings of the parameters of analog audio hardware device 104. In some implementations, derivation of the formant-based filter representation may include analysis of the processed calibration signal using linear predictive analysis.

At 606, the method continues with the question: Have all incremental settings for the current parameter been measured? If No, return to step 602; if Yes, proceed to 607. At 607, the method continues with the question: Have all parameters been measured? If Yes, create a digital model of the sonic characteristics of analog audio hardware device 104; if No, select the next as-yet-unmodelled parameter of analog audio hardware device 104 and return to 603. When a new parameter is selected, increasing the changing the setting of the parameter may include adjusting the adjustable control from the neutral setting to a first calibration setting or adjusting the adjustable control to a next incremental setting. In some implementations, the calibration process of method 600 may be repeated using different resolutions of the calibration increments ("smoothing factors") to establish a relative complexity of analog audio hardware device 104.

Creating the digital model of the sonic characteristics of the analog audio hardware device may include determination of a plurality of Infinite Impulse Response (IIR) filter coefficients corresponding to the various settings of the adjustable controls for the parameters of analog audio hardware device 104.

Based on the baseline impulse response of analog audio hardware device 104 and the plurality of calibration signals, create a digital model of analog audio hardware device 104. In some implementations, computing device 110 may identify characteristic peaks or nodes of each incremental calibration signal to reproduce the sonic characteristics of analog audio hardware device 104.

Figure 7:
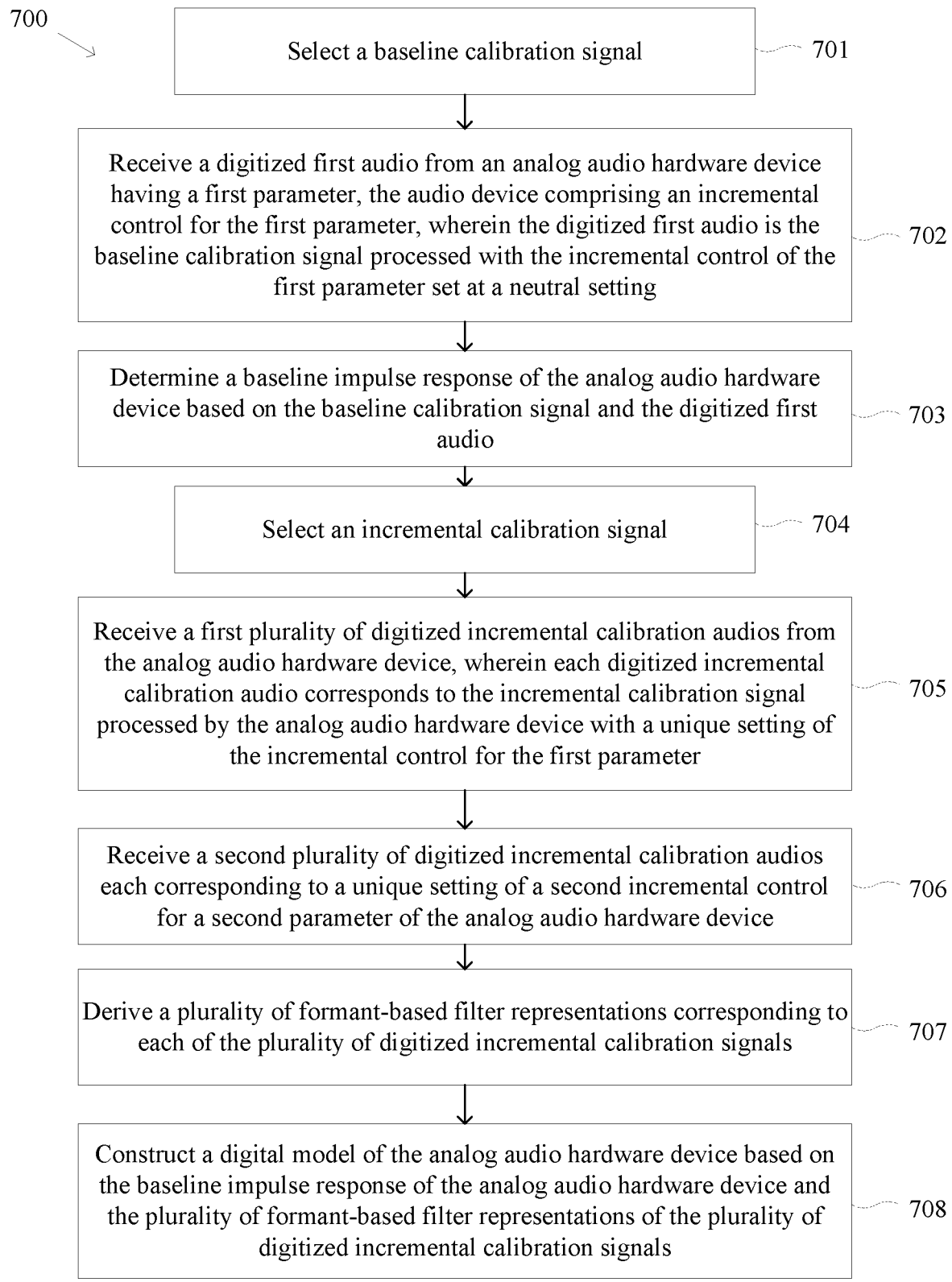
FIG. 7 shows a flowchart illustrating an exemplary flowchart depicting a method for digitally modeling analog audio hardware devices, according to one implementation of the present disclosure.

FIG. 7 shows a flowchart illustrating an exemplary method for digitally modeling analog audio hardware devices, according to one implementation of the present disclosure. At 701, hardware processor 120 selects a baseline calibration signal. At 702, hardware processor 120 receives a digitized first audio from analog audio hardware device 104 having a first parameter, analog audio hardware device 104 comprising an incremental control for the first parameter, wherein the digitized first audio may be the baseline calibration signal processed with the incremental control of the first parameter set at a neutral setting.

In some implementations, a neutral setting may correspond to a lowest setting of the incremental control, a middle setting of the incremental control, or another neutral incremental setting. For example, a neutral position of a low-frequency equalizer parameter having incremental controls ranging from −15 dB to 15 dB may be a middle setting of 0 dB. Another example may be a frequency sweep control having a low setting of 1 kHz and a high setting of 15 kHz for which a neutral setting may be the 1 kHz setting, 7.5 kHz, 15 kHz, or some other setting in the range.

At 703, hardware processor 120 determines a baseline impulse response of analog audio hardware device 104 based on the baseline calibration signal and the digitized first audio. In some implementations, the baseline impulse response of analog audio hardware device 104 may include the characteristics of the baseline calibration signal after processing by analog audio hardware device 104. Hardware processor 120 may analyze the processed baseline calibration signal or differences between the baseline calibration signal and the processed baseline calibration signal to identify various characteristics of analog audio hardware device 104. For example, hardware processor 120 may compare the characteristics of the baseline calibration signal with the characteristics of the processed baseline calibration signal and analyze differences in the intensity, duration, frequency distribution, phase, and other characteristics to determine the baseline impulse response of analog audio hardware device 104. In some implementations, hardware processor 120 may determine FIR coefficients for the baseline impulse response of analog audio hardware device 104.

In some implementations, the system may calculate a minimal number of FIR coefficients necessary and sufficient to model analog audio hardware device 104. By using a minimal number of FIR coefficients, the system reduces the processing power necessary to execute sonic modeling module 147. In some implementations, the FIR coefficients may be non-phase-linear. These non-phase-linear coefficients may allow sonic modeling module 147 to maintain the phase distortion properties of analog audio hardware device 104. The phase distortion properties may be part of what gives analog audio hardware device 104 its distinctive analog sonic characteristics. In some implementations, the non-linear phase FIR filters may require fewer coefficients than their phase-linear counterparts.

At 704, hardware processor 120 selects an incremental calibration signal. The incremental calibration signal may be a random noise signal that is not a frequency sweep signal. At 705, hardware processor 120 receives a first plurality of digitized incremental calibration audios from analog audio hardware device 104, wherein each digitized incremental calibration audio corresponds to the incremental calibration signal processed by analog audio hardware device 104 with a unique setting of the incremental control for the first parameter. For example, the first incremental setting of an equalizer parameter having incremental controls ranging from −15 dB to 15 dB may be a lowest setting of about −15 dB. The equalizer parameter having incremental controls ranging from −15 dB to 15 dB may have about 31 incremental settings corresponding to 1 dB incremental steps spanning the range of the parameter. Hardware processor 120 may receive a processed calibration signal corresponding to each incremental setting of the equalizer parameter.

At 706, hardware processor 120 receives a second plurality of digitized incremental calibration audios each corresponding to a unique setting of a second incremental control for a second parameter of analog audio hardware device 104. For example, the second parameter may be a second frequency range of the equalizer, a trim setting, a low pass filter setting, a high pass filter setting, a frequency sweep parameter, or other parameter of analog audio hardware device 104.

At 707, hardware processor 120 derives a plurality of formant-based filter representations corresponding to each of the plurality of digitized incremental calibration audios. In some implementations, hardware processor 120 may derive the plurality of formant-based filer representations using a linear prediction analysis of the plurality of processed calibration signals. Hardware processor 120 may repeat the calibration process using different resolutions, or smoothing factors, of the increments for the parameters of analog audio hardware device 104. Repeating with one or more different resolutions of increments may create a more complex model of the performance of analog audio hardware device 104. In some implementations, executable code 140 may automate the calibration process.

At 708, hardware processor 120 constructs a digital model of the analog audio hardware device based on the baseline impulse response of the analog audio hardware device and the plurality of formant-based filter representations of the plurality of digitized incremental calibration audios. Based on the baseline impulse response determined by baseline characteristic module 141 and the waveform characteristics identified by waveform characteristics module 143, sonic modeling module 147 creates a digital model of analog audio hardware device 104.

In some implementations, hardware processor 120 may identify characteristic peaks, or nodes, of the plurality of processed calibration signals. In some implementations, sonic modeling module 147 may use a root-solution analysis of the filters from baseline acquisition module 141. Waveform characteristics module 143 may be used to identify the characteristic nodes to create the digital model. In some implementations, the nodes relate to the sonic characteristics of analog audio hardware device 104 at a given setting or combination of settings of the incremental controls of the various parameters of analog audio hardware device 104.

Hardware processor 120 may mathematically review each node in isolation and assign a suitable resonant peak frequency, relative gain value, and quality factor (Q) with which to construct a second order Infinite Impulse Response (IIR) filter. The number of required nodes depends on the complexity of the current setting or combination of settings. In some implementations, nodes can be created and destroyed as required while system 100 is in use.

Executable code 140 may provide the deliverables, including coefficients for a single FIR baseline filter which, through convolution, defines the "baseline character" of the device, along with a series of Infinite Impulse Response (IIR) filter coefficients implemented for user-controllable settings. In some implementations, executable code 140 may use these coefficients in a suitable development environment in order to produce a digital representation of analog audio hardware device 104.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   an analog input for receiving an analog input signal;
   an analog-to-digital (A/D) converter configured to convert the analog input signal from an analog form to a digital form and generate a digitized audio;
   a non-transitory memory storing an executable code; and
   a hardware processor executing the executable code to:
   select a baseline calibration signal;
   receive a digitized first audio from an analog audio hardware device having a first parameter, the audio device comprising an incremental control for the first parameter, wherein the digitized first audio is the baseline calibration signal processed with the incremental control of the first parameter set at a neutral setting;
   determine a baseline impulse response of the analog audio hardware device based on the baseline calibration signal and the digitized first audio;
   select an incremental calibration signal;
   receive a first plurality of digitized incremental calibration audio from the analog audio hardware device, wherein each digitized incremental calibration audio corresponds to the incremental calibration signal processed by the analog audio hardware device with a corresponding incremental setting of the incremental control for the first parameter;

derive a plurality of formant-based filter representations corresponding to each of the plurality of digitized incremental calibration audios; and construct a digital model of the analog audio hardware device based on the baseline impulse response of the analog audio hardware device and the plurality of formant-based filter representations of the plurality of digitized incremental calibration audios.

2. The system of claim 1, wherein, before the hardware processor derives a plurality of formant-based filter representations, the hardware processor further executes the executable code to:

receive a second plurality of digitized incremental calibration audios each corresponding to an incremental setting of a second incremental control for a second parameter of the analog audio hardware device.

3. The system of claim 1, wherein the hardware processor applies a linear predictive analysis to derive the plurality of formant-based filter representations.

4. The system of claim 1, wherein, before the hardware processor receives the digitized first audio, the hardware processor executes the executable code to transmit the baseline calibration signal to the analog audio hardware device, and after the hardware processor determines the baseline impulse response of the analog audio hardware device, the hardware processor executes the executable code to transmit the incremental calibration signal to the analog audio hardware device before the hardware processor receives the first plurality of digitized incremental calibration audios.

5. The system of claim 1, wherein the baseline calibration signal is one of a random noise signal and an audio frequency sweep.

6. The system of claim 1, wherein the incremental calibration signal is a random noise signal that is not a frequency sweep signal.

7. The system of claim 1, wherein the formant-based filter representations are created by identifying characteristic nodes of the first plurality of digitized incremental calibration audios.

8. The system of claim 1, wherein the neutral setting comprises the incremental setting of the first parameter is set to zero.

9. The system of claim 1, wherein the hardware processor further executes the executable code to:

receive a second input signal;
process the second input signal using the digital model of the analog audio device;
transmit the processed second input signal for playback on a speaker.

10. A method for execution by a computing device including a hardware processor and a non-transitory memory, the method comprising:

selecting, using the hardware processor, a baseline calibration signal;

receiving, using the hardware processor, a digitized first audio from an analog audio hardware device having a first parameter, the audio device comprising an incremental control for the first parameter, wherein the digitized first audio is the baseline calibration signal processed with the incremental control of the first parameter set at a neutral setting;

determining, using the hardware processor, a baseline impulse response of the analog audio hardware device based on the baseline calibration signal and the digitized first audio;

selecting, using the hardware processor, an incremental calibration signal;

receiving, using the hardware processor, a first plurality of digitized 5 incremental calibration audios from the analog audio hardware device, wherein each digitized incremental calibration audio corresponds to the incremental calibration signal processed by the analog audio hardware device with a corresponding incremental setting of the incremental control for the first parameter;

deriving, using the hardware processor, a plurality of formant-based filter representations corresponding to each of the plurality of digitized incremental calibration audios; and constructing, using the hardware processor, a digital model of the analog audio hardware device based on the baseline impulse response of the analog audio hardware device and the plurality of formant-based filter representations of the plurality of digitized incremental calibration audios.

11. The method of claim 10, wherein, before deriving a plurality of formant-based filter representations, the method further comprises receiving a second plurality of digitized incremental calibration audios each corresponding to a an incremental setting of a second incremental control for a second parameter of the analog audio hardware device.

12. The method of claim 10, wherein deriving the plurality of formant-based filter representations includes applying a linear predictive analysis to each of 5 the plurality of digitized incremental calibration audios.

13. The method of claim 10, wherein, before receiving the digitized first audio, the method further comprises transmitting the baseline calibration signal to the analog audio hardware device, and after determining the baseline impulse 10 response of the analog audio hardware device, the method further comprises transmitting the incremental calibration signal to the analog audio hardware device before the hardware processor receives the first plurality of digitized incremental calibration audios.

14. The method of claim 10, wherein the baseline calibration signal is one of a random noise signal and an audio frequency sweep.

15. The method of claim 10, wherein the incremental calibration signal is a random noise signal that is not a frequency sweep signal.

16. The method of claim 10, wherein the formant-based filter representations are created by identifying characteristic nodes of the plurality of calibration signals.

17. The method of claim 10, wherein the neutral setting comprises the incremental setting of the first parameters is set to zero.

18. The method of claim 10, further comprising:

receiving, using the hardware processor, a second input signal;
processing, using the hardware processor, the second input signal using the digital model of the analog audio device;
transmitting, using the hardware processor, the processed second input signal for playback on a speaker.

* * * * *